(12) United States Patent
Fleming et al.

(10) Patent No.: US 9,987,697 B1
(45) Date of Patent: Jun. 5, 2018

(54) FAUCET THREAD CLEANER

(71) Applicants: William Dean Fleming, Weatheford, OK (US); Theodore Bradley, North Ridgeville, OH (US)

(72) Inventors: William Dean Fleming, Weatheford, OK (US); Theodore Bradley, North Ridgeville, OH (US)

(73) Assignees: William Dean Fleming, Weatherford, OK (US); MAGNA INDUSTRIES, INC., Cleveland, OH (US)

( * ) Notice: Subject to any disclaimer, the term of this patent is extended or adjusted under 35 U.S.C. 154(b) by 0 days. days.

(21) Appl. No.: 15/041,603

(22) Filed: Feb. 11, 2016

Related U.S. Application Data

(60) Provisional application No. 62/176,198, filed on Feb. 11, 2015.

(51) Int. Cl.
  *B23G 9/00* (2006.01)
  *B08B 9/02* (2006.01)
  *B08B 1/00* (2006.01)

(52) U.S. Cl.
  CPC .............. *B23G 9/009* (2013.01); *B08B 1/001* (2013.01); *B08B 9/021* (2013.01)

(58) Field of Classification Search
  CPC . B23G 1/26; B23G 5/04; B23G 5/043; B23G 9/009; B08B 9/021
  See application file for complete search history.

(56) References Cited

U.S. PATENT DOCUMENTS

| | | | | |
|---|---|---|---|---|
| 3,031,699 A | * | 5/1962 | Fleury | B23G 1/22 33/645 |
| 4,927,302 A | * | 5/1990 | Beaty | B23G 5/043 408/221 |
| 5,490,746 A | * | 2/1996 | Baker | B23G 5/043 408/123 |
| 6,500,383 B2 | * | 12/2002 | Zinelli | B23G 5/005 266/271 |
| 7,862,441 B2 | * | 1/2011 | Nash | B23G 5/043 408/219 |
| D712,221 S | | 9/2014 | Kovach | |
| 2008/0268966 A1 | * | 10/2008 | Pawloski | B23G 5/04 470/185 |
| 2017/0014925 A1 | * | 1/2017 | Alho | B23G 9/009 |

* cited by examiner

*Primary Examiner* — Edward Tolan

(57) ABSTRACT

A one piece hand tool is provided for cleaning and chasing water faucet threads. The hand tool has an engagement end and an operating end spaced along a central tool axis. Intermediate the engagement end and operating end, an external surface is provided with an overall hexagonal configuration. The engagement end is open for accessing an internal threaded surface for engagement with water faucet threads to be cleaned. Four equally spaced vertical grooves parallel with the central tool axis are provided in the internal threaded surface of the hand tool and disrupt the internal threaded surface to contain debris during operation of the tool. The internal threaded surface has sharp leading and trailing edges for cleaning and chasing the water faucet threads during engagement and disengagement with the hand tool.

9 Claims, 3 Drawing Sheets

FAUCET THREAD CLEANER

CROSS-REFERENCE TO RELATED APPLICATIONS

The present application claims priority from, and incorporates herein by reference, the subject matter of U.S. Application Ser. No. 62/176,198 filed Feb. 11, 2015.

FIELD OF INVENTION

The present application relates to a hand held tool for cleaning and renewing threads in faucets, such as water hose faucet threads or indoor and outdoor plumbing faucets.

BACKGROUND

The threads of water spigots can become damaged and dirty over time. Particularly the threads of spigots such as outdoor frost free hydrants or water spigots on an exterior building wall for attachment to a hose, or indoor plumbing faucets such as utility tubs or water heater spigots. The threads may be painted over, or suffer damage by minor impacts, wear or corrosion. Damage to faucet threads may result in frustrating leaks that can be annoying and even costly. A leaky hose can increase water costs and if not repaired, may eventually cause foundational damage. If a new hose gasket does not stop the leak, it may become necessary to replace the spigot which can also be costly and time consuming.

SUMMARY

This application provides a useful one-piece hand tool for cleaning, chasing, re-tracing or renewing the unique thread surfaces of a water spigot or faucet. The tool provides a time and money saving solution to clean and repair spigot threads. The tool will restore the existing threads from minor impact dings or damage, and will remove residues such as hard water mineral build-up, or accidental substances on the threads such as paint, glue, concrete or other foreign materials. Once renewed to working condition, water hoses are able to make a proper faucet connection with a sealing rubber washer at the bottom of the hose faucet surface. The tool is made from high strength, heat treated steel or steel alloy, such as a stainless steel alloy, which may be plated for corrosion protection.

DETAILED DRAWING DESCRIPTIONS

DETAILED DESCRIPTION

Figure 1:
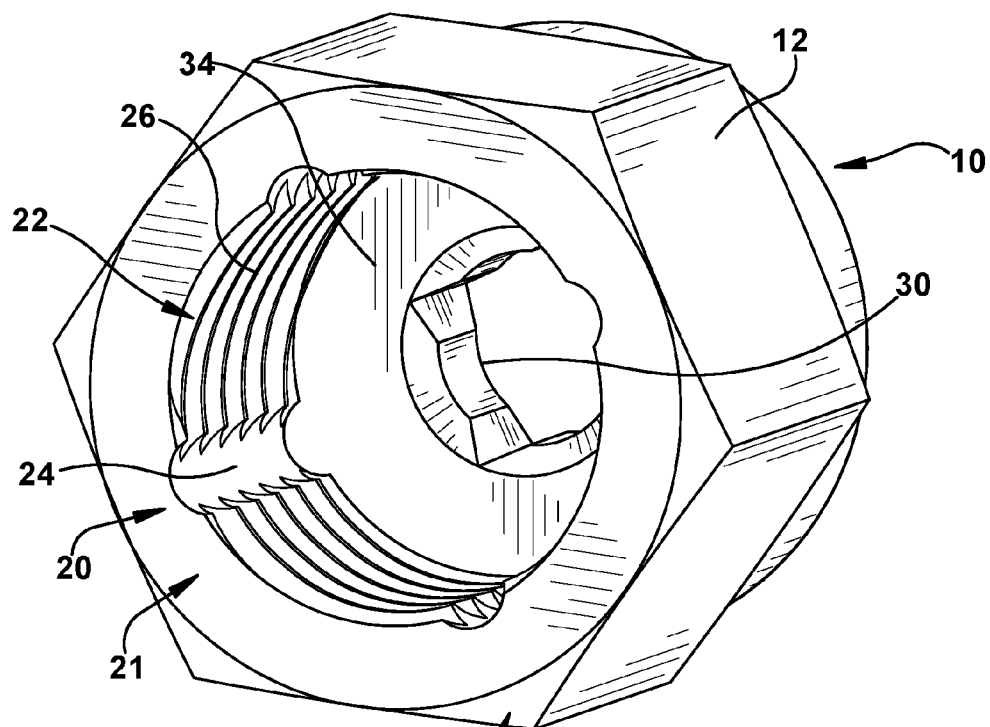
FIG. 1 is a bottom perspective view of the thread cleaner hand tool of the present application.
Figure 2:
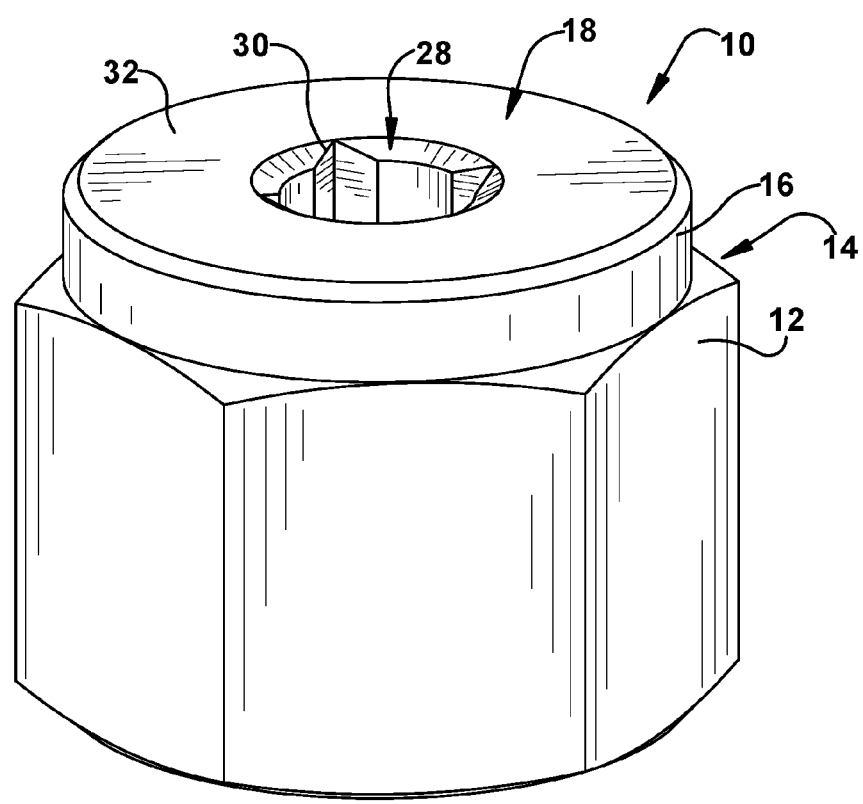
FIG. 2 is a side perspective view of the thread cleaner hand tool of FIG. 1.
Figure 4A:
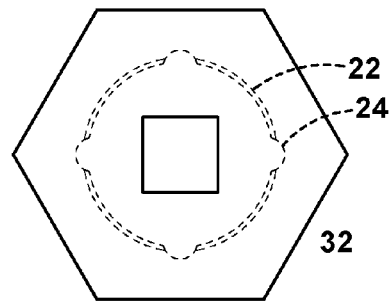
FIGS. 4A, 4B and 4C are top, side and bottom plan views, respectively, of an alternate embodiment of the tool of FIG. 1.

The one-piece thread cleaning or repairing hand tool 10 of the present application is shown in FIGS. 1 to 7. Use of the hand tool 10 on dirty threads or threads with minor damage T enables water hoses to make a proper connection with a sealing rubber washer at the bottom of the hose faucet surface. It is well known that the thread standard for garden hose connectors, or standard water faucets or spigots, which in North America may also be known as "garden hose thread" or GHT, is ¾ inch diameter straight (non-tapered) thread with a pitch of 11.5 TPI (threads per inch, where the male part has an outer diameter of 1 1/16 inches (26.99 mm)).

The hand tool 10 is manufactured by cutting hexagonal steel or stainless steel alloy bar stock to the desired size which ideally fully engages the standard water faucet threads T. In the illustrated embodiment of FIG. 3B, the hand tool 10 has a height H of approximately 1.2 inches, and a width W of approximately 1.4 inches. The generally hexagonal overall external configuration 12 of the tool allows the user to perform the tool's function using a wrench, a standard pair of pliers, or with a ⅜ inch ratchet drive and extension D. The corners 14 of the hand tool may be chamfered to avoid sharp edges during handling by a user. If desired, as shown in FIG. 3B, a rounded boss 16 may be provided adjacent an operating end 18.

On an engagement end 20 of the hand tool 10, an inner diameter is manufactured by cutting an internal surface to form an internal threaded surface 22 having the proper thread pitch for threaded engagement with a threaded water spigot. As shown in FIGS. 3A, 4A and 3C, 4C, the internal threaded surface is drilled and tapped for ¾ inch-11.5 TPI with a minimum depth of 0.8 inches, where roots of the threads are shown in dashed lines and crests of the threads are shown in solid lines. The engagement end 20 is open and defined by the internal threaded surface 22 for engagement with ¾ inch standard water spigot threads.

Figure 3A:
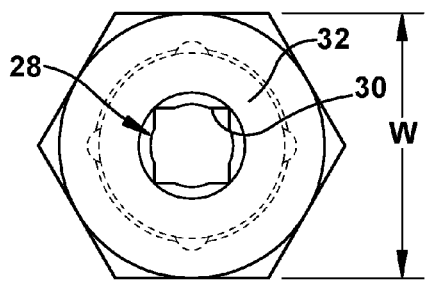
FIGS. 3A, 3B and 3C are top, side and bottom plan views, respectively, of the tool of FIG. 1.
Figure 3B:
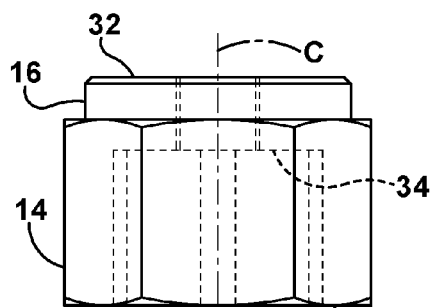
Figure 4B:
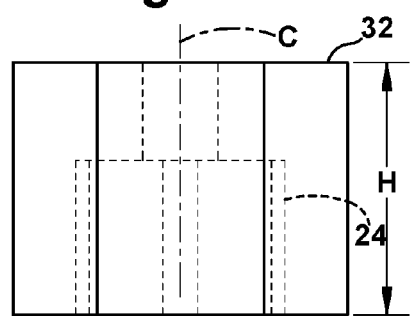
Figure 3C:
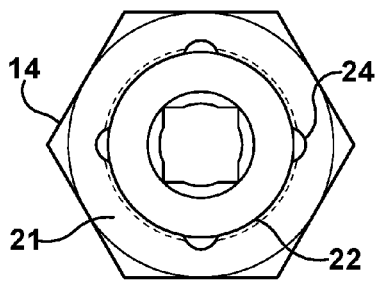
Figure 4C:
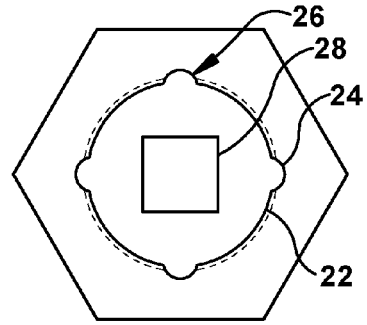

Elongate grooves, channels or chip relief slots 24 are also formed on the inner diameter of the tool 10, which slots 24 are aligned with a central axis C of the tool, shown in FIGS. 3B and 4B. The slots 24 have a semi-circular cross-sectional configuration, and interrupt or disrupt the internal threaded surface 22, such that the preferred four slots 24 provide chip relief to receive residue or chips removed from the spigot threads during use of the tool. The slots 24 are spaced evenly around the internal threaded surface 22 parallel with the central axis C. It should be understood that multiple slots 24 are preferably provided, however, the number of slots may be 2, 3, 4 or higher, to provide sufficient space within the slots for the debris G being removed.

Figure 4D:
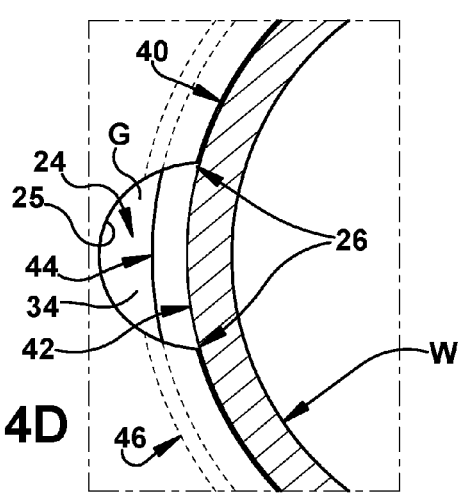
FIG. 4D is a cut-away view of the tool of FIG. 3C or 4C engaged with the threads of a dirty water faucet being cleaned.
Figure 5:
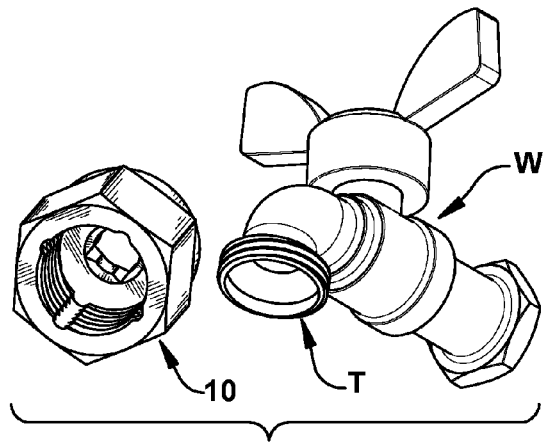
FIG. 5 is a bottom perspective view of the thread cleaner hand tool of the present application prior to engagement of the tool with the threads of a sample standard faucet (disconnected from any plumbing pipes), also shown.
Figure 6:
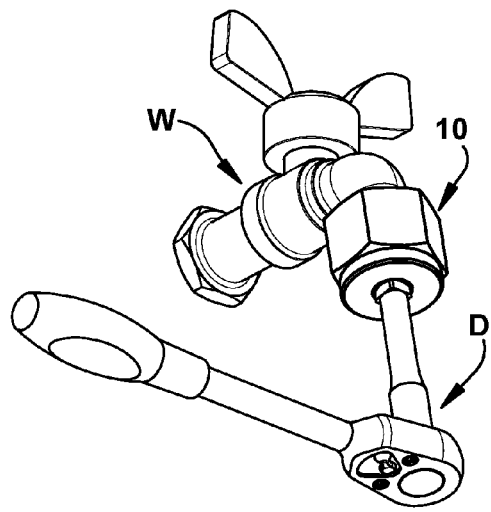
FIG. 6 is a side perspective view of the thread cleaner hand tool engaged with the standard faucet of FIG. 5, and with a standard ratchet wrench engaged with the thread cleaner hand tool for moving the thread cleaner hand tool on the threads of the standard faucet to clean, chase or renew the standard faucet threads.
Figure 7:
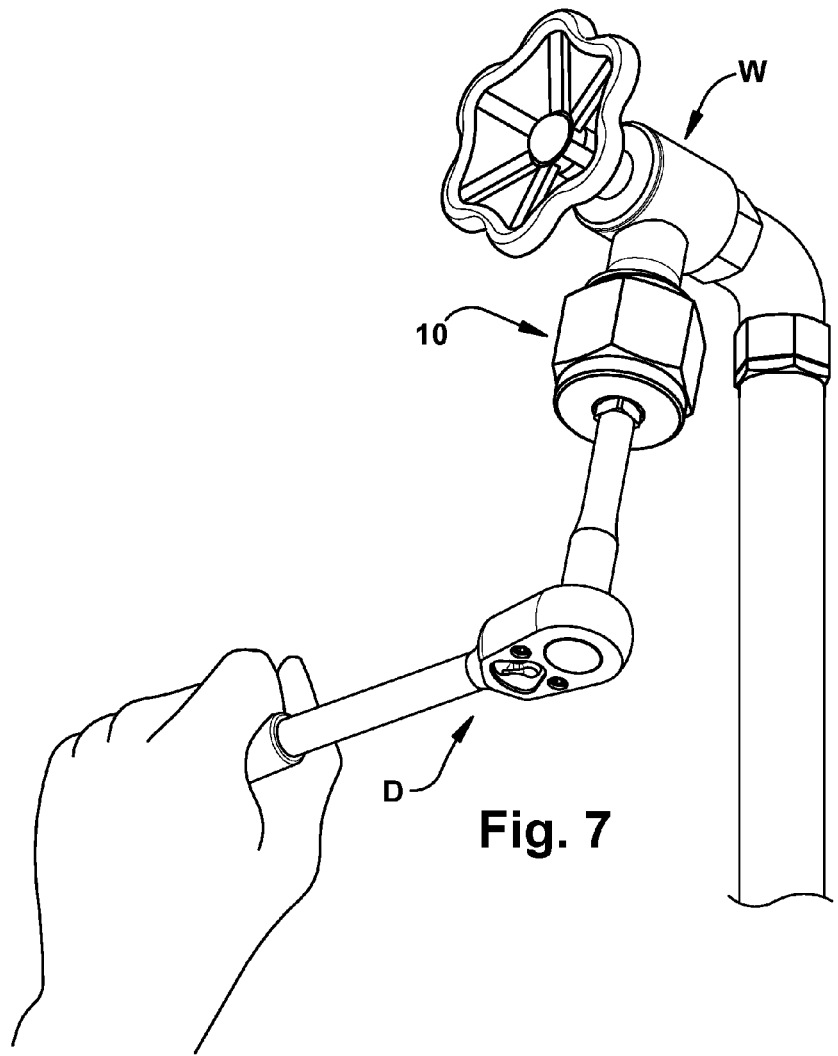
FIG. 7 is a perspective view of the thread cleaner hand tool engaged with another standard faucet interconnected with plumbing pipes, and with a standard ratchet wrench engaged with the thread cleaner hand tool for moving the thread cleaner hand tool on the threads of the illustrated standard faucet to clean, chase or renew the standard faucet threads.

As shown in FIG. 4D the internal threaded surface 22 includes a leading edge 26 (or trailing edge, depending on the direction of tool rotation) formed at the crest 40 of each internal thread and the intersection with the chip relief slots 24. The semi-circular configuration of the slots 24 results in a configuration in which each leading edge 26 is sharp. As the tool is rotated, the root 42 of the threads of the spigot S are engaged with the sharp leading edge 26 of each crest 40 of the tool, such that minor damage in the threads T of the water spigot S are cut by the leading edge 26 or mineral deposits removed, thereby repairing and cleaning the threads. During engagement of the tool 10, each crest 44 of the spigot threads T is likewise engaged adjacent the root 46 of the internal threads 22 of the tool. As debris G is removed from the threads spigot S, the debris is deposited within the semi-circular slots, moved by the action of the engaged threads 22, T. As shown, the slots 24 are deep enough to avoid contact between the bottom 25 of the slot and the crest 44 of the threads of the spigot S, and to allow space for the collecting debris G. In the event the spigot threads T are very dirty, additional lubricant may be of assistance. Alternatively, water from the spigot F being cleaned may be used to flush the tool during operation. It is noted that the hand tool 10 does not clean or clear the bottom sealing surface of the hose faucet surface, and does not prevent water hose leaks, but is intended to clean and repair or renew dirty threads or threads T with minor thread damage. Neither is the hand tool 10 able to cut threads on blank materials, nor renew faucet threads that are out of round or otherwise badly damaged.

An operating end 18 of the hand tool 10, opposite and spaced from the engagement end 20, forms an attachment 28 having a central opening 30 for attachment with a ratchet drive or other wrench D. The central opening 30 is aligned with a central axis C of the hand tool 10, which central axis passes through the tool between the top surface 32 of the attachment 28 and a bottom surface 21 on the engagement end 20 adjacent the threaded surface 22. The attachment 28 is also provided with additional internal surface configurations, as shown in FIGS. 1-3A, 4A, for attachment of a ratchet drive or wrench for applying torque during use of the tool.

To make use of the hand tool 10, the tool is engaged on the engagement end 20 with the threads T of the water spigot S to be cleaned or repaired. It is noted that care must be taken to engage the threads properly, in mating position, in order to avoid misalignment of the threads which may damage the water spigot threads if improperly engaged. The tool is threaded first in a clockwise direction into mating engagement along the internal threaded surface 22 with the spigot threads T. The hand tool 10 continues to be threaded, by hand or using a wrench, onto the threads T of the water spigot S. Once resistance is felt on the tool 10, a ratchet drive or other wrench D (power tools are not recommended, as they may damage the spigot) may be used to apply torque to the tool. It should be understood that depending on the corrosion or damage to the faucet threads, the tool 10 may need to be moved repeatedly forward and backward (clockwise and counterclockwise) on the threads T. With each such forward and/or backward movement, the sharp leading edges 26 (or trailing edges, depending on the direction of movement) of the internal threaded surface are engaged and disengaged, repeatedly, with the water spigot threads T to chase and/or remove damage/debris from the water spigot threads. Eventually, the spigot threads T are completely covered by the hand tool 10, or the spigot threads T bottom out against an inner portion 34 of the attachment of the tool.

Once the tool 10 has been fully engaged, reverse torque in the counterclockwise direction is applied, and the ratchet drive or wrench D reverses operation to remove the tool 10 from the spigot threads T. The corrosion, dirt or debris G removed from the threads will be seen falling out of the slots 24. The water spigot S is then left with clean and improved threads T. By tapping the tool 10 against a surface, additional debris G provided into the grooves 24 or chip relief slots during engagement will be deposited onto the surface for disposal.

Although the hand tool of the present application has been described in detail sufficient for one of ordinary skill in the art to practice the invention, it should be understood that various changes, substitutions and alterations may be made without departing from the spirit or scope of the device as defined in the attached claims. Moreover, the scope of the present device is not intended to be limited to the specific embodiments described here, which are provided by way of example. As one of ordinary skill in the art will readily appreciate from the disclosure of the present device and its embodiments, other components and means presently existing or later to be developed that perform substantially the same function to achieve substantially the same result as those of the corresponding embodiments described here, may be utilized according to the present application. Accordingly, the appended claims are intended to include within their scope such other components or means.

We claim:

1. A one piece hand tool for cleaning water faucet threads, the hand tool having an engagement end and an operating end spaced along a central tool axis and the height of the tool intermediate the engagement end and operating end is no greater than approximately 1.2 inches; intermediate the engagement end and operating end an external surface is provided with a generally hexagonal overall configuration having opposed pairs of flat surfaces and the width between the opposed pairs of flat surfaces is approximately 1.4 inches; the engagement end is open for providing access to an internal threaded surface having internal threads of 11.5 threads per inch with a minimum depth of 0.8 inches for threaded engagement with ¾ inch standard water faucet threads to be cleaned; debris slots parallel with the central tool axis are provided in the internal threaded surface of the hand tool and disrupt the internal threads; and a sharp leading edge is provided at the intersection of each internal thread with the debris slots for cleaning and chasing the water faucet threads during engagement with the hand tool.

2. The one piece hand tool of claim 1, further providing no more than four debris slots in the internal threaded surface of the hand tool.

3. The one piece hand tool of claim 1 or 2, wherein the debris slots are equally spaced around the central tool axis.

4. The one piece hand tool of claim 3, wherein the debris slots in the internal threaded surface of the hand tool have a semi-circular cross-sectional configuration.

5. The one piece hand tool of claim 4, wherein a bottom of the semi-circular cross-sectional configuration of the debris slots is deep enough to avoid contact with the water faucet threads being cleaned.

6. The one piece hand tool of claim 1, wherein the operating end is provided with an attachment opening for operating engagement with a conventional wrench.

7. The one piece hand tool of claim 6, wherein the attachment opening for operating engagement is a square opening.

8. The one piece hand tool of claim 7, wherein the internal threaded surface ends at an inner portion immediately adjacent the attachment opening.

9. A one piece hand tool for cleaning water faucet threads, the hand tool having an engagement end and an operating end spaced along a central tool axis; intermediate the engagement end and operating end an external surface has a generally hexagonal overall configuration having opposed pairs of flat surfaces and the width between the opposed pairs of flat surfaces is approximately 1.4 inches; the engagement end is open for accessing an internal threaded surface having internal threads of 11.5 threads per inch with a minimum depth of 0.8 inches for threaded engagement with ¾ inch standard water faucet threads to be cleaned; four equally spaced debris slots parallel with the central tool axis and having a semi-circular cross-sectional configuration are provided in the internal threaded surface of the hand tool and disrupt the internal threaded surface; and the internal threaded surface has a sharp leading edge for cleaning and chasing the water faucet threads during engagement with the hand tool.

* * * * *